US 6,622,064 B2

(12) United States Patent
Bartholomew et al.

(10) Patent No.: US 6,622,064 B2
(45) Date of Patent: Sep. 16, 2003

(54) NAIL POLISH SELECTION METHOD

(75) Inventors: Julie R. Bartholomew, Birmingham, MI (US); Charles P. Hines, Jr., Hamburg, MI (US)

(73) Assignee: IMX Labs, Inc., Birmingham, MI (US)

( * ) Notice: Subject to any disclaimer, the term of this patent is extended or adjusted under 35 U.S.C. 154(b) by 81 days.

(21) Appl. No.: 09/818,389

(22) Filed: Mar. 27, 2001

(65) Prior Publication Data

US 2001/0047309 A1 Nov. 29, 2001

Related U.S. Application Data

(60) Provisional application No. 60/193,916, filed on Mar. 31, 2000.

(51) Int. Cl.$^7$ .............................................. G06F 17/00
(52) U.S. Cl. ........................ 700/233; 700/239; 222/52; 222/144
(58) Field of Search ............................... 700/231, 232, 700/233, 234, 239, 242, 243, 241; 222/52, 144

(56) References Cited

U.S. PATENT DOCUMENTS

| 967,938 | A | 8/1910 | Krause |
|---|---|---|---|
| D96,564 | S | 8/1935 | Simpkins |
| 2,393,371 | A | 1/1946 | Harris |
| 2,417,677 | A | 3/1947 | Cohan |
| D192,180 | S | 2/1962 | Hodgman |
| 3,860,015 | A | 1/1975 | Tarro |
| 4,160,271 | A | 7/1979 | Grayson et al. |
| 4,434,467 | A | 2/1984 | Scott |
| 4,561,850 | A | 12/1985 | Fabbri et al. |
| 4,681,546 | A | 7/1987 | Hart |
| 4,705,083 | A | 11/1987 | Rossetti |
| 4,830,218 | A | 5/1989 | Shirkhan |
| 4,846,184 | A | 7/1989 | Comment et al. |
| 4,871,262 | A | 10/1989 | Krauss et al. |
| 4,887,410 | A | 12/1989 | Gandini |

(List continued on next page.)

FOREIGN PATENT DOCUMENTS

| DE | 41 10 299 C1 | 2/1993 |
|---|---|---|
| EP | 0 443 741 B1 | 8/1991 |
| EP | 0446512 B1 | 1/1995 |
| EP | 0 682 236 B1 | 11/1995 |
| EP | 0 686 997 A2 | 12/1995 |
| JP | 05-025020 | 2/1993 |
| JP | 05-107115 | 4/1993 |
| JP | 05-233651 | 9/1993 |
| JP | 07-243908 | 9/1995 |
| JP | 07-270396 | 9/1995 |
| JP | 08-050125 | 2/1996 |
| JP | 08-280633 | 10/1996 |
| JP | 09-038045 | 2/1997 |
| JP | 09-133584 | 5/1997 |
| JP | 09-178560 | 7/1997 |

(List continued on next page.)

OTHER PUBLICATIONS

Information from www.reflect.com.
Information from www.threecustom.com.
Informatioan from www.colorlab–cosmetics.com.
Copending U.S. application Ser. No. 09/872,929 filed Jun. 1, 2001.
Copending U.S. application Ser. No. 29/142,835 filed Jun. 1, 2001.

(List continued on next page.)

Primary Examiner—Khoi H. Tran
(74) Attorney, Agent, or Firm—Dobrusin & Thennisch PC

(57) ABSTRACT

A user interactive custom nail polish color and effects dispensing system and method of doing business, including for both point of sale and remote (e.g., via internet) transactions.

8 Claims, 6 Drawing Sheets

U.S. PATENT DOCUMENTS

| | | |
|---|---|---|
| D306,808 S | 3/1990 | Thomas |
| 4,909,632 A | 3/1990 | McFarlane |
| 4,953,985 A | 9/1990 | Miller |
| 4,966,205 A | 10/1990 | Tanaka |
| 4,967,938 A | 11/1990 | Hellenberg |
| 5,044,520 A | 9/1991 | Moisan |
| D322,542 S | 12/1991 | Fontlladosa |
| 5,078,302 A | 1/1992 | Hellenberg |
| 5,083,591 A | 1/1992 | Edwards et al. |
| 5,116,134 A | 5/1992 | Edwards et al. |
| 5,119,973 A | 6/1992 | Miller et al. |
| D327,695 S | 7/1992 | Edstrom |
| D327,895 S | 7/1992 | Edstrom |
| 5,137,367 A | 8/1992 | Madonia et al. |
| 5,163,010 A | 11/1992 | Klein et al. |
| 5,163,484 A | 11/1992 | Howlett et al. |
| 5,193,720 A | 3/1993 | Mayberry |
| 5,197,802 A | 3/1993 | Miller et al. |
| 5,203,387 A | 4/1993 | Howlett et al. |
| 5,268,620 A | 12/1993 | Hellenberg |
| 5,268,849 A | 12/1993 | Howlett et al. |
| 5,271,628 A | 12/1993 | Okada |
| 5,305,917 A | 4/1994 | Miller et al. |
| 5,310,257 A | 5/1994 | Altieri, Jr. et al. |
| 5,311,293 A | 5/1994 | MacFarlane et al. |
| 5,313,267 A | 5/1994 | MacFarlane et al. |
| D347,645 S | 6/1994 | Miller |
| D347,646 S | 6/1994 | Mayberry |
| 5,328,057 A | 7/1994 | Hellenberg et al. |
| D349,506 S | 8/1994 | Caruso et al. |
| 5,356,041 A | 10/1994 | Hellenberg et al. |
| 5,361,812 A | 11/1994 | Arneson et al. |
| 5,368,196 A | 11/1994 | Hellenberg et al. |
| 5,397,134 A | 3/1995 | Fishman et al. |
| 5,407,100 A | 4/1995 | Tracy et al. |
| 5,460,297 A | 10/1995 | Shannon et al. |
| 5,478,238 A | 12/1995 | Gourtou et al. |
| D366,304 S | 1/1996 | Lewis |
| 5,480,288 A | 1/1996 | Hellenberg et al. |
| 5,495,338 A | 2/1996 | Gouriou et al. |
| 5,507,575 A | 4/1996 | Rossetti |
| 5,524,656 A | 6/1996 | Konarski et al. |
| 5,537,211 A | 7/1996 | Dial |
| 5,549,372 A | 8/1996 | Lewis |
| D374,677 S | 10/1996 | Hodson et al. |
| 5,562,109 A | 10/1996 | Tobiason |
| 5,562,643 A | 10/1996 | Johnson |
| 5,566,693 A | 10/1996 | Gunderman et al. |
| 5,612,868 A | 3/1997 | Off et al. |
| 5,622,692 A | 4/1997 | Rigg et al. |
| 5,626,155 A | 5/1997 | Saute |
| 5,626,260 A | 5/1997 | Waldner |
| 5,632,314 A | 5/1997 | Koppe et al. |
| 5,636,637 A | 6/1997 | Guiolet et al. |
| 5,643,341 A | 7/1997 | Hirsch et al. |
| 5,647,411 A | 7/1997 | Koppe et al. |
| 5,668,633 A | 9/1997 | Cheetam et al. |
| 5,687,322 A | 11/1997 | Deaton et al. |
| 5,690,252 A | 11/1997 | Oleksiewicz et al. |
| 5,692,291 A | 12/1997 | Deevi et al. |
| 5,697,527 A | 12/1997 | Altieri, Jr. et al. |
| 5,711,458 A | 1/1998 | Langeveld et al. |
| 5,711,601 A | 1/1998 | Thomas et al. |
| 5,715,314 A | 2/1998 | Payne et al. |
| 5,717,750 A | 2/1998 | Adams, Jr. et al. |
| 5,720,017 A | 2/1998 | Cheetam et al. |
| 5,724,424 A | 3/1998 | Gifford |
| D393,150 S | 4/1998 | Swanston et al. |
| 5,771,524 A | 6/1998 | Woods et al. |
| 5,778,901 A | 7/1998 | Abrahamian |
| 5,785,510 A | 7/1998 | Altieri, Jr. et al. |
| 5,785,960 A | 7/1998 | Rigg et al. |
| 5,797,750 A | 8/1998 | Gouriou et al. |
| 5,813,420 A | 9/1998 | Sussman |
| D401,246 S | 11/1998 | Langeveld et al. |
| 5,841,421 A | 11/1998 | Cheetam et al. |
| 5,842,641 A * | 12/1998 | Mazzalveri ............... 239/104 |
| 5,860,809 A | 1/1999 | Meehan |
| 5,862,947 A | 1/1999 | Wiegner et al. |
| 5,897,204 A | 4/1999 | Dittmer et al. |
| 5,903,465 A * | 5/1999 | Brown ............... 700/242 |
| 5,904,421 A | 5/1999 | Mazzalveri |
| 5,906,433 A | 5/1999 | Mazzalveri |
| 5,924,426 A | 7/1999 | Galazin |
| 5,931,166 A | 8/1999 | Weber et al. |
| 5,945,112 A | 8/1999 | Flynn et al. |
| 5,960,411 A | 9/1999 | Hartman et al. |
| 5,971,351 A | 10/1999 | Swaab |
| 5,972,322 A | 10/1999 | Rath et al. |
| 5,992,691 A | 11/1999 | Post et al. |
| 5,993,792 A | 11/1999 | Rath et al. |
| 6,000,407 A | 12/1999 | Galazin |
| 6,002,488 A | 12/1999 | Berg et al. |
| 6,003,731 A | 12/1999 | Post et al. |
| 6,021,362 A | 2/2000 | Maggard et al. |
| 6,035,860 A | 3/2000 | Mombourquette |
| 6,035,867 A | 3/2000 | Barrick |
| 6,056,158 A | 5/2000 | Rossetti et al. |
| 6,065,969 A | 5/2000 | Rifkin et al. |
| 6,089,538 A | 7/2000 | Shirkhan |
| 6,139,429 A | 10/2000 | Shoemaker, Jr. |
| 6,158,997 A | 12/2000 | Post |
| 6,177,093 B1 * | 1/2001 | Lombardi et al. ........... 424/401 |
| D437,151 S | 2/2001 | Gerstmar |
| 6,198,536 B1 | 3/2001 | Baker |
| 6,202,895 B1 | 3/2001 | Fox |
| D442,405 S | 5/2001 | Gerstmar |
| 6,293,284 B1 | 9/2001 | Rigg |
| 6,297,420 B1 | 10/2001 | Heincke |
| 6,338,349 B1 | 1/2002 | Robinson et al. |
| 6,412,658 B1 * | 7/2002 | Bartholomew et al. ........ 222/1 |
| D461,080 S | 8/2002 | Bartholomew et al. |
| D465,810 S | 11/2002 | Bartholomew et al. |
| 6,510,366 B1 | 1/2003 | Murray et al. |
| 6,516,245 B1 | 2/2003 | Dirksing et al. |

FOREIGN PATENT DOCUMENTS

| | | |
|---|---|---|
| JP | 10-339670 | 12/1998 |
| JP | 11-169231 | 6/1999 |
| JP | 11-218447 | 8/1999 |
| JP | 11-265443 | 9/1999 |
| SU | 1704759 | 1/1992 |
| WO | WO98/30189 | 7/1998 |
| WO | WO 99/34905 | 7/1999 |
| WO | US01/09777 | 3/2001 |
| WO | WO01/75586 | 10/2001 |
| WO | WO01/91600 | 12/2001 |

OTHER PUBLICATIONS

Copending U.S. application Ser. No. 29/142,822 filed Jun. 1, 2001.

Web Page of "Coty Introduces Jovan Individuality" pp. 1–3 (accessed Jun. 8, 2001).

Pamphlet of Jovan, "Express your individuality".

Copending Patent Application entitled "Nail Polish Color Selection System", Ser. No. 09/818,077, filed Mar. 27, 2001 (Our Ref. No. 1026–001).

Information from www.cosmetics.com/custblnd.htm.

Information from www.colorlab–cosmetics.com.

Evans, "An Introduction to Color", John Wiley & Sons, Inc, New York, 1948, pp. 87–90.

Wyszecki et al., "Color Science; Concepts and Methods, Quantitative Data and Formulae", 2nd Edition, A. Wiley Intescience Publication, p. 63.

Cheskin, L. "Color Guide for Marketing Media", The MacMillan Co., 1954, pp. 133–140.

Lovett, P.A., et al., "Measurement of the Skin Colour of Babies in Hospital," National Lighting Conference 1986, pp. 140–154.

"The Shades of You; Your Color Palette," Your New Image California Fashion Image, Crown Summit Books, 1981, pp. 1–3,17,21–29,97–105, 111,112,120–127.

Shibatani, J., et al., "Measurements of Aging Effects of Facial Color Distribution and Applications," J. Soc. Cosmet. Chem. Japan, vol. 19 No. 1, 1985, pp. 48–52.

* cited by examiner

NAIL POLISH SELECTION METHOD

CLAIM OF BENEFIT OF FILING DATE

The present application claims the benefit of the filing date of U.S. Provisional Application Ser. No. 60/193,916, filed Mar. 31, 2000, the contents of which are hereby incorporated by reference.

FIELD OF THE INVENTION

The present invention pertains to the field of cosmetics color selection, more particularly to customer interactive nail polish color selection systems, and still more particularly to color selection systems having an actual or virtual point of sale nail polish color selection system including a polish dispenser.

BACKGROUND OF THE INVENTION

Historically the cosmetics industry has afforded consumers a broad variety of choices for colors (including tones, shades or hues) and effects. In the typical scenario, these products are pre-packaged according to a predetermined fixed amount of different colors or effects. The products are then ordinarily displayed to reveal a spectrum of a fixed number of colors. However, because of manufacturing and other practical limitations, point of sale displays only afford a finite number of selections for the consumer. Consequently, the consumer's choice of color will be limited by present availability or supply of a particular color choice, and also particularly by the specific colors chosen for sale in advance by the manufacturer. The consumer is afforded no practical opportunity to custom blend a color selection.

This has become a particularly acute issue in the field of nail polishes, where point of sale displays typically offer a finite selection of colors, and most often, confined to a range of white to red to black. Thus, for instance, a manufacturer may offer 48 different colors at a point of sale display. Moreover, the nail polishes are offered as previously dispensed and packaged items, some of which are further sealed in additional protective packaging. For sake of discussion, assume a number is assigned to each of the 48 different colors (e.g., 1 for white, 24 for primary red, 48 for black, and the remaining integers from 1–48 to correspond to the intermediate shades or tones). A consumer may desire to purchase the color corresponding to the number 21. If the point of sale display does not have a stock of that number, the consumer is faced with selecting a second choice. Likewise, the consumer might like numbers 27 and 28, but would prefer a mixture of the two (e.g. what would thus correspond to a number 27.5), the consumer will be also prevented from purchasing her first choice of colors.

In recent years, it has also become popular to modify the ultimate visual appearance of a manicure by the addition of effects over some or all of a nail, such as a metallic effect, sparkles, shapes (e.g., hearts, stars, etc.), texture or the like. Frequently, these must be purchased and applied separately from an underlying base coat. Once again, the consumer is faced with a finite selection and will be limited in choice by availability at the point of sale.

In view of the foregoing, a need has developed for a custom cosmetic color selection system, pursuant to which a consumer or other customer (such as an intermediate retailer or wholesaler) can interact with the supplier to select a specific color, effect or both, to blend the resulting cosmetic product at or near the time of selection (e.g. on site at a point of sale location, or remotely such as by mail order, phone order or internet purchase).

Of potential interest to this application are U.S. Pat. No. 6,000,407 (Galazin); U.S. Pat. No. 5,945,112 (Flynn et al.); U.S. Pat. No. 5,924,426 (Galazin); U.S. Pat. No. 5,860,809 (Meehan); U.S. Pat. No. 5,797,750 (Gouriou et al.); U.S. Pat. No. 5,778,901 (Abrahamian); U.S. Pat. No. 5,717,750 (Gouriou et al); U.S. Pat. No. 5,643,341 (Hirsch et al.); U.S. Pat. No. 5,566,693 (Gunderman et al.); U.S. Pat. No. 5,562,109 (Tobiason); U.S. Pat. No. 5,478,238 (Gourtou et al.); U.S. Pat. No. 5,313,267 (MacFarlane et al.); U.S. Pat. No. 5,311,293 (MacFarlane et al.); U.S. Pat. No. 4,561,850 (Fabbri et al.); U.S. Pat. No. 4,160,271 (Grayson et al.); U.S. Pat. No. 2,417,677 (Cohan); and U.S. Pat. No. 2,393,371 (Harris), hereby incorporated by reference.

SUMMARY OF THE INVENTION

The present invention meets the foregoing need by providing a system, particularly one employed at a point of sale, for the custom selection, design, blending, mixing and/or packaging of a cosmetic, and more particularly a liquid cosmetic color, effect or both, and still more particularly a nail polish color, effect or both. The present invention includes one or a combination of components that facilitate a customer-interactive process of custom cosmetic selection. Though applicable to the selection and preparation of cosmetics other than nail polish (such as, lip gloss, eye gel, cheek gel, creams, lotions, perfumes or the like), the present invention is illustrated by reference to one example of a system for customizing a nail polish selection.

Pursuant to such example, the system includes a nail polish dispenser that contains a plurality of different shades, tints or hues of colors or pigments, which can be dispensed in preselected proportions to create a custom color selection. Preferably, an interactive computer system is in controlling communication with the dispenser, although the dispenser may be operated manually. Such computer allows the customer to custom choose a color and/or effect, information about which will be communicated to the dispenser, which then dispenses the appropriate proportions of the ingredients pursuant to information about the color choice stored in a data base or otherwise programmed. In another embodiment, the system includes a remote communications system, whereby a user can communicate, such as via the internet, with the computer controlling the nail polish dispensing system and select and purchase a custom nail polish for custom dispensing and delivery to the user.

DETAILED DESCRIPTION OF THE PREFERRED EMBODIMENT

Figure 1:
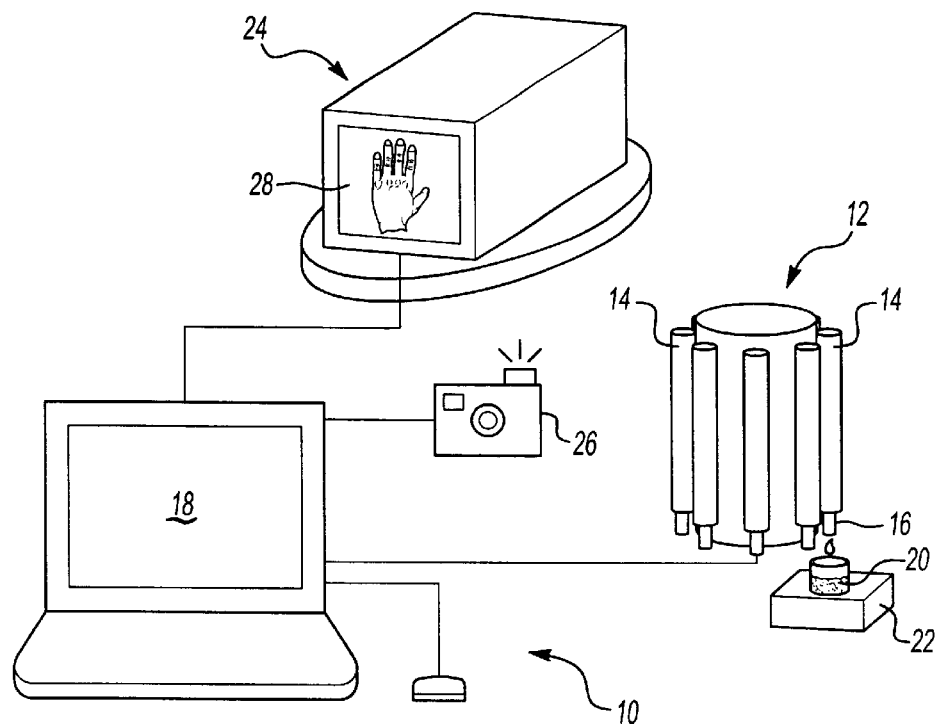
FIG. 1 is a schematic of one illustrative example of a system in accordance with the present invention.

The present invention is directed to a unique system for custom formulating liquid cosmetic compositions, and is illustrated by reference to an exemplary system for custom formulating nail polish. Accordingly, in a preferred embodiment, as shown in FIG. 1, the system 10 includes a nail polish dispenser 12 that contains a finite plurality of different shades, tints or hues of colors or pigments, which can be dispensed in preselected proportions to create a custom color selection, and optionally a color selection from a virtually infinite range of colors. The dispenser 12 preferably has a fixed number of chambers 14 for holding each of the different shades, tints, or hues of colors or pigments. The chambers 14 have an outlet with a nozzle 16 as shown. Alternatively, the chambers 14 may dispense to a common chamber to all of the chambers 14, which in turn dispense to an external receptacle for receiving a nail polish. Though the dispenser may be operable manually, preferably it is automated or controlled by a computer, such as computer 18 shown in controlling communication with the dispenser. Of course, it is also possible that the computer provides information to a separate controller, which then controls dispensing of liquids. For instance, color selection or other transaction-related information may be entered into a computer (e.g. using the keyboard or mouse shown or alternatively using a touch screen monitor, bar code scanner, or other input device) by a computer operator or user of the system, which may be the consumer, a technician, or other user.

The dispenser configuration may vary as desired. In one embodiment (not shown), the dispenser contains one or more translatable (e.g., manually or via a suitable motor, such as a stepper motor adapted for linear or rotational motion, or a combination thereof) nozzles that will dispense the different materials in the respective chambers into one or more receptacles 20 fixed in a single location. Alternatively, the receptacle may be placed on a platform or other mounting stage 22, which itself is translatable (e.g., manually or via a suitable motor, such as a stepper motor adapted for linear or rotational motion, or a combination thereof).

The platform or stage may also include a vibrator or shaker to assure uniform mixing and dispersion of the ingredients. A vibrator or shaker may be employed independent of the platform or stage. Such vibrator shaker or other mixer will typically have a motor that reciprocally drives a member for holding a receptable containing the ingredients to be mixed. Examples of such auxiliary components are disclosed, for instance, in U.S. Pat. Nos. 5,906,433 and 5,507,575, hereby incorporated by reference.

The dispenser of the present invention may employ technology of the type commonly encountered in paint color custom dispensing systems, such as those employed in hardware stores for dispensing pigment into a base paint to custom tailor the paint color. In this regard, it is possible that one or more different base nail polish colors may be employed into which suitable proportions of different tones, shades or hues of colors may be introduced, as common in on-site paint color selection and mixing systems. Implicit in this, of course, is that a plurality of colors can be mixed into a clear base or into a common solvent. The dispenser is, of course, modified to take into account the particular needs of a nail polish dispensing system, such as the incorporation of a suitable nozzle system and optionally a nozzle cleaning system, as discussed further herein. Examples of other instruments suitable for this application might employ technology such as that disclosed in U.S. Pat. No. 4,705,083 (Rosetti), U.S. Pat. No. 5,904,421 (Mazzalveri), U.S. Pat. No. 6,056,158 (Rosefti et al.) and International Application No. WO 99/34905, the disclosures of which are incorporated by reference.

The computer employed in the system of the present invention preferably has a database stored in its memory or is otherwise programmed such that the entry of a particular color selection into the computer will retrieve information about the specific proportions of shades, tints or hues necessary for dispensing to achieve the ultimate desired color (e.g., the specific recipe associated with the color). The computer may also be equipped with a suitable mathematical integration feature such that, where a color selected finds no exact formula or recipe match, the computer will calculate the formula or recipe by reference to data associated with nearby colors. To illustrate, by reference to the example provided in the Background section, suppose that a user desires a shade of 26.74, but the data base of the computer only offers data to the shade of 26.7 or 26.8, the computer will calculate the relative changes to the formula that will be necessary to achieve a value of 26.74.

The computer 18 is capable of outputting the data associated with the color choice to a suitable controller associated with either the nail polish dispenser, the computer itself, or both, which will then dispense the appropriate predetermined proportion of the recipe or formula ingredients into the receptacle 20. The computer 18 will have like capabilities for dispensing preselected nail effects (which may be dispensed from a dispenser associated with the nail polish dispenser or a separate dispenser).

In one embodiment, as shown in FIG. 1, the system includes a personal viewing station 24 that simulates or provides virtual feedback to a user about how a particular color or effect selection will look on that particular user. For instance, the system includes a camera 26 or other visual information input or gathering device (e.g., a video recorder), preferably a digital device, which captures an image of the user and transport information about that image to a computer or directly to a video monitor 28 or viewing screen for display. A computer (which preferably but need not be the computer for color selection) is connected to the monitor or screen.

In a particularly preferred embodiment, the computer has software that can locate generally the location of the users nails (such as by scanning a region for a pattern of color or tone changes commonly associated with nails, whether coated or not). Upon isolating the location of the nails, the computer delivers information to the regions corresponding to the nail locations about the specific color choices selected by the user. Thus, a user can view his or her hand or foot on the screen with a color choice superimposed on it. In one embodiment the superimposed image is generated while the user's hand or foot is in the viewer of the visual information input device, and the user obtains real time information about color choice (e.g. a hand could be placed in the view of a camera and simultaneously the nail locations are detected and virtually applied to the image of the nails on the monitor, whereby the user can move the hand and the images on the monitor will simultaneously respond to such movement). In another embodiment, the user will have an image taken of the hand or foot and the image will be fixed and stored in memory so that the user need may have free use of that body part while experimenting with different color choices.

Of course, the user need not confine use of the viewing station to that of images of the user's body part. The computer may be programmed to store images of body parts of other persons (e.g., professional models), or body parts other than hands or feet (e.g., lips, facial features or other body parts). Moreover, the computer may include photo modification or morphing features so that users can experiment with different creative ideas, or with images of jewelry, gloves, sandals or other shoes, tattoos, body piercings or the like which can be superimposed onto the body part displayed. Of course the computer is also suitably programmed with basic functions such as menus of color schemes, effects, as well as color charts, color chips or the like.

In one embodiment, a user can match a color with a preexisting desired color. For instance, one preferred approach to color matching is to employ a spectrophotometer, and particularly, a portable one such as that commercially available from GretagMacbeth (e.g., SPECTROLINO™), X-Rite, Inc., Datacolor (e.g., MICROFLASH®SPECTROPHOTOMETERS). Without limitation, other examples of spectrophotometers include those described in U.S. Pat. No. 6,002,488 (Berg et al.) and U.S. Pat. No. 6,198,536 (Baker), both hereby incorporated by reference. Other suitable color matching techniques are possible as well, such as those addressed in U.S. Pat. No. 5,668,633 (Cheetam et al.); U.S. Pat. No. 5,720,017 (Cheetam et al.); and U.S. Pat. No. 5,841,421 (Cheetam et al.), all hereby incorporated by reference. Any such spectrophotometer can be integrated into an overall apparatus or portably removable.

Figure 2:
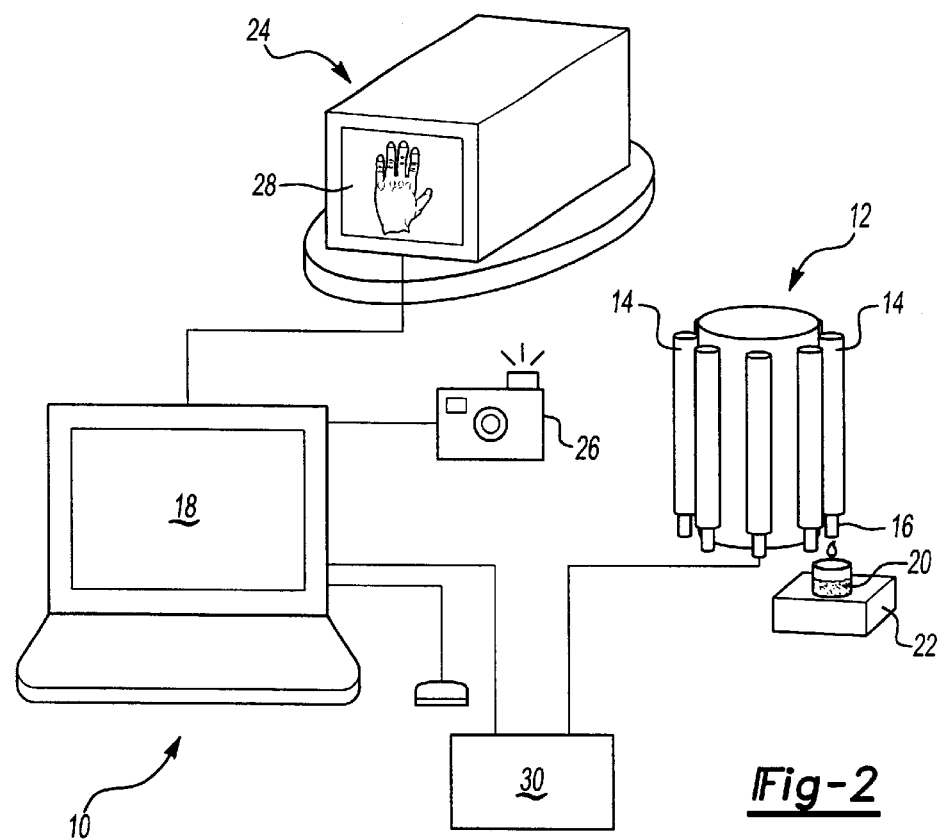
FIG. 2 is a schematic of another illustrative example of a system in accordance with the present invention.

In another aspect of the present invention, such as shown by FIG. 2 (which includes like reference numerals to correspond to like parts as in FIG. 1), the color selection is done using a remote communication system 30, such as by mail order, phone order or preferably via the internet. Thus, the point of purchase will be remote from the point of dispensing. In this embodiment, for example an internet web site is maintained which permits a user such as a remote user to select cosmetic color or effect, view the colors chosen either on a pallet or virtual mannequin, for instance, place orders for the specific color and/or effect chosen, and pay for such order. The user could also transmit an image of the user's body part to the web site, which then permits a personal virtual viewing, such as described previously. The web site includes a page that offers the user a choice of custom blending a cosmetic or ordering from stock, with appropriate links to such respective pages. The page includes a link to an order or checkout page, which optionally may be associated with all other pages. Preferably a user that elects to link to a color selection page is then offered choices of linking to particular different cosmetic types.

Of course, the skilled artisan will appreciate that direct or indirect links between all pages of the web site may be made available to the user (with or without appropriate security measures; moreover, all or only some of the pages may be linked to the home page or to any other preselected page, such as a site map page). One page offers the user at least one spectrum (either continuous or not) of color or choices. The user is able to navigate a cursor to any location in the spectrum to choose a color that the user desires to view (this feature may also be employed with on site, point of sale computers, either with or without tangible pallets or color or effects chips).

Upon selecting a color, the user advances to a page or another location on the same page to view the color or effect independent of other colors or effects, or optionally in side by side or like adjacent comparison relative to other colors or effects. Once the user selects a color or effect, the user is provided the option of further shopping or immediate check out. Upon checking out the information (e.g., formula) about the user's color and effect choice is communicated to a dispenser of the type discussed previously, where the information is fed to a controller and the user's choice is dispensed packaged and provided to the user (e.g., by shipping to the user).

The web site (as with the other system where sales may not occur remotely from dispensing) will allow users to store profiles about themselves. For instance, a user will be able to store favorite color or effect choices, historical information about the user, and other biographical information about the user. Optionally, the website is adapted to permit the user to set up an account with ship-to, bill-to, credit card, and/or preferred shipping method information, which is retrievable, such via a password entry in later visits, and used for expedited check-out, as is common in conventional one-click internet shopping routines. The web site may also feature an advisory page, where specific information about the person is provided, and based thereon, a computer program will provide the user with recommended selections. The web site will feature suitable security precautions to allow users to trust the confidentiality of the transaction and credit card information. The web site may also afford business to business accommodations, so that packagers, retailers, wholesalers or other intermediate vendors can custom order individual or lots of products for delivery to a desired location. The skilled artist should be acquainted with various existing techniques for retail networking architecture and operation, which permit the placement and processing of a purchase order, examples of which are disclosed without limitation in U.S. Pat. No. 5,960,411 (Hartman et al.; "one click" shopping); U.S. Pat. No. 5,715,314 (Payne et al.; sales and payment transactions); U.S. Pat. No. 5,724,424 (sales and payment transactions); all of the teachings of which are hereby expressly incorporated by reference for all purposes.

In one embodiment, payment is made through a debit system. For instance, purchasers can buy prepaid debit or "smart cards" cards in a desired amount, either at a retail outlet or remote (e.g., over the internet), or in the like manner, they can pay in a certain amount into an account and draw on that amount. Cash and credit card transactions are also contemplated.

Whether obtained through the web site or elsewhere, in one embodiment, it is contemplated that information about purchaser preferences can be compiled in a database, e.g., for real time analysis. Thereafter, the data is queried or otherwise analyzed for evaluating demographic correlations, as well as consumer color preference data. In this manner, for instance, the information would provide valuable assistance to retailers and manufacturers (particularly those who do not employ point of sale color selection), who would rely upon such information to make decisions concerning the quantities of inventory of a color or effect to stock or manufacture. To illustrate, without limitation, data polled from the point of sale system of the present invention in the southwest states of the United States might indicate that the three most popular shades of color in that region are 26.17, 27.28 and 27.48, with 78% of consumer sales having preferred those colors. Faced with a limited number of shades that the typical conventional manufacturer or vendor has imposed for its inventory, the most popular can be selected using the above data so that the likelihood of excess inventory is reduced. In this regard, data collected may also be employed in determining recipients of product sample distribution, delivery of coupons and the like, such as disclosed in U.S. Pat. No. 6,021,362 (Maggard et al.), U.S. Pat. No. 5,612,868 (Off et al.), and U.S. Pat. No. 5,687,322 (Deaton et al.), hereby incorporated by reference.

In another aspect of the present invention, an improved method of selling cosmetics and specifically nail polish is provided. The method preferably is practiced at the point of sale to a customer, and more preferably a retail customer.

The method includes the basic steps of offering a customer or other user choices of colors and effects, which optionally exceed in amount the number of choices available from conventional over the counter cosmetic sales displays; optionally, permitting the user to view an image of themselves or another with the nail polish virtually affixed to the nails of such person; providing a formula or recipe to a nail polish dispensing device associated with the specific color or effect chosen by the user; and dispensing the specific color or effect chosen. The methods may also include additional steps as disclosed elsewhere in this discussion.

In one particularly preferred embodiment, the method further includes using the same dispensing apparatus but repeating the above basic steps for a different selection. Thus, a first user selects a first nail polish formulation for dispensing, and thereafter a second user selects a second nail polish for dispensing. The dispensing apparatus may be configured to dispense the first formulation selection while the second selection is made, prior thereto, or subsequently thereafter, so that the same apparatus is used consecutively for different formulations.

The specific nail polishes employed may be conventional nail polish compositions or may be water based compositions. The nail polishes may include any of a variety of modifying agents such as conventional thickeners, thinners, drying agents, adhesion modifiers or the like. The nail polish may also include a preselected fragrance. The nail polishes may be temporary in nature or may wear for several days or longer. The individual respective nail polish compositions prepared according to the present invention may be formulated from a common base composition, or from a mixture of different materials, i.e., where the common base composition is clear (e.g., a solvent).

Turning in more detail to one of the preferred aspects of the present invention, an improved nozzle system is provided that may be used in combination with conventional fluid dispensing machines, such as those disclosed in U.S. Pat. No. 4,705,083 (Rosetti), U.S. Pat. No. 5,904,421 (Mazzalveri), U.S. Pat. No. 6,056,158 (Rosetti et al.) and International Application No. WO 99/34905, the disclosures of which are incorporated by reference. The improved nozzle system is particularly attractive for dispensing nail polish materials, which pose unique challenges to fluid dispensing, in view of their relatively high viscosities and the need to be able to reproducibly dispense the fluid into a small diameter package opening (e.g., into a nail polish bottle).

Accordingly, a nozzle is configured for receiving a fluid from a conduit and dispensing it into a receptacle such as a nail polish bottle. The nozzle is adapted at one portion for receiving a fluid supply, e.g., fluid supplied through a supply system including a supply line network and a fluid delivery mechanism for transporting fluid from a supply source (e.g., chamber). Another portion of the nozzle system is configured for defining a nozzle tip configuration, through which fluid passes upon exiting the fluid dispensing system.

The nozzle tip configuration may be one that includes a plurality of individual nozzle tips, each preferably associated with a different supply (although a common supply for some or all of the tips is also possible), which converges to a single exit orifice. More preferably, the nozzle tip configuration includes a plurality of nozzle tips that converge to a relatively small region, (e.g., less than about 4 square centimeters, more preferably less than about 2 square centimeters, and still more preferably less than about 1 square centimeter) to enable the sequential or parallel supply of one or more streams of fluid ingredients into a relatively small opening (e.g., on the order of a diameter or like dimension less than about 25 mm, and more preferably less than about 15 mm, and still more preferably less than about 10 mm), such as that found in the opening of a nail polish bottle, which though larger sizes are possible, preferably range in size per color selection of up to about 100 ml and more preferably about 9 to about 45 ml, and still more preferably about 20 to about 40 ml. Small volume single use bottles are also possible, as are plural chamber bottles for storing multiple formulations.

It will be appreciated that the dispensing system of the present invention is capable of dispensing ingredients in microfluidic amounts, e.g., as low as on the order of about 0.01 to about 0.4 microliters. In one embodiment this is made possible by the use of a suitable micropump, or microfluidic device, such as pump by a chip etched with microfluid channels. Ink jet dispensing systems can also be employed.

Figure 3:
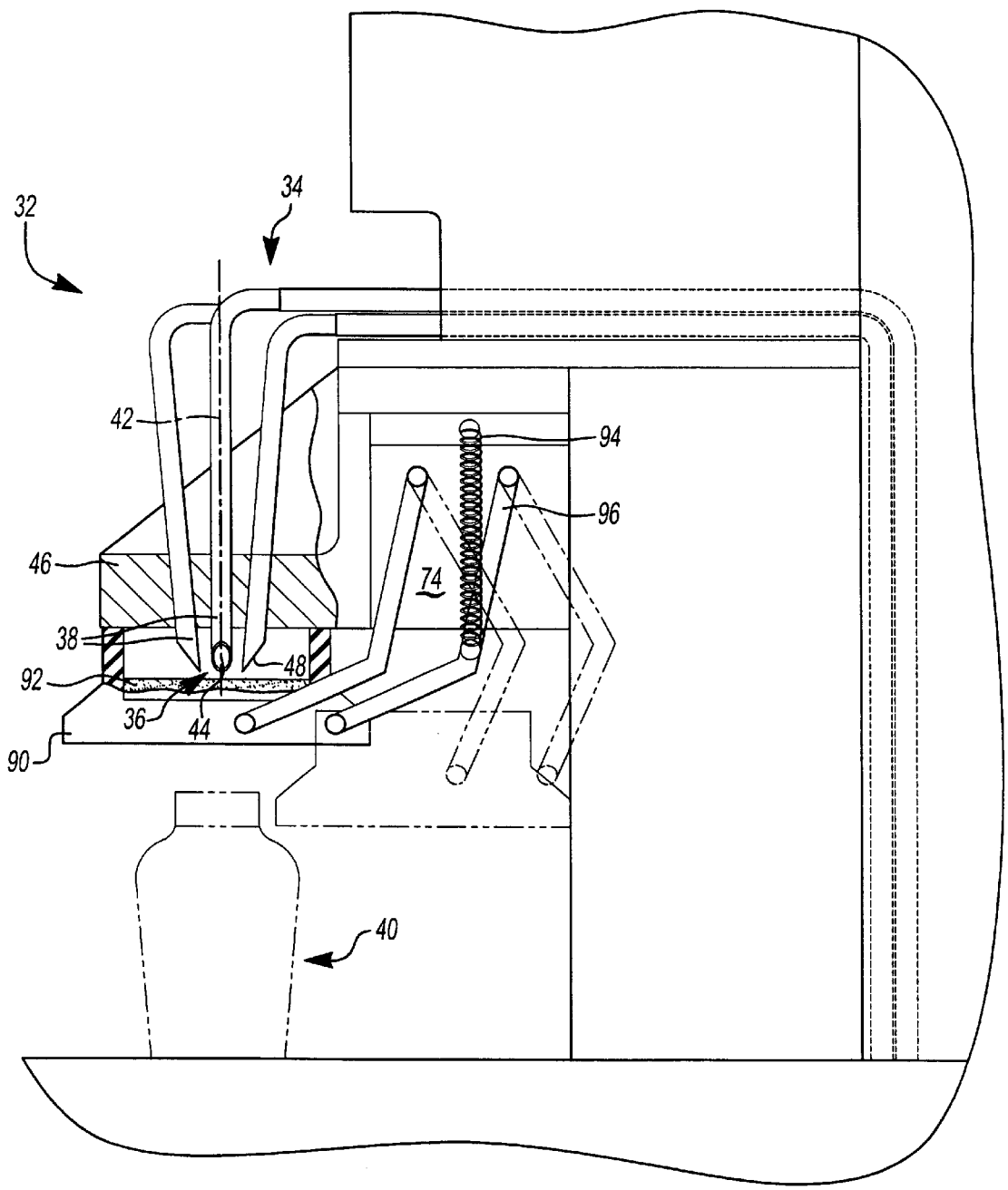
FIG. 3 is a sectional view of a nozzle system.
Figure 4:
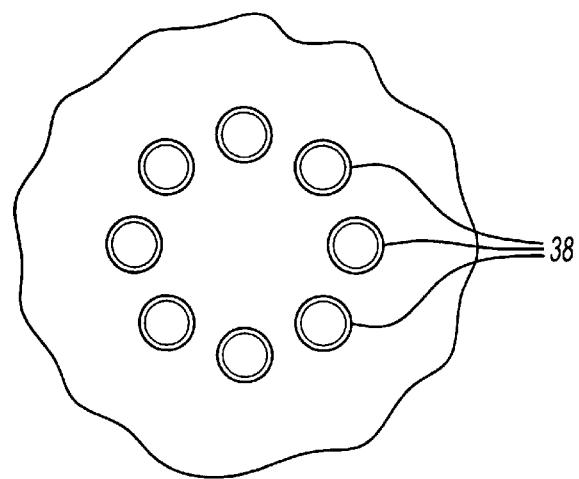
FIG. 4 is a view of one exemplary nozzle arrangement.

Referring by way of example to FIG. 3, one illustrative nozzle 32 is shown as including a supply inlet portion 34 and a nozzle tip exit portion 36. The nozzle tip exit portion 36 includes a plurality of clustered nozzle tips 38. The nozzle tips 38 are clustered relative to each other in any suitable manner. Though depicted in a circular formation in FIG. 4, other suitable arrangements may be used, such as helical, braided, in-line, in a "v" configuration, stacked or the like.

Preferably, in the region immediately adjacent each exit orifice, the nozzle tips 38 are curved, angled or otherwise disposed so that the nozzle tips 38 converge toward a common dispensing region 40. For instance, FIG. 3 shows one preferred embodiment employing relatively straight nozzles tips 38; with the nozzle tips 38 being axially angled from between about 5 and 85 degrees from a vertical centerline 42 of the nozzle arrangement. In a more preferred nozzle embodiment, the nozzle tips are axially angled from between about 20 and about 50 degrees of the vertical centerline of the nozzle arrangement. In a most preferred nozzle embodiment, the arrangement of nozzles is angled at about 30 degrees of the vertical centerline. In yet another embodiment, it is possible that the nozzle tip is bent to have an axis that is offset relative to the axis of the immediately upstream nozzle tip 38 portion.

The nozzle tips 38 may be continuous with or separable from the supply network to which they are connected. The nozzle tips 38 may be plastic, glass, stainless steel or some other suitable material. The material may be further treated to improve its fluid transport properties. For instance, it is foreseeable that one or more nozzle tips 38 may be modified to enhance the fluid flow properties at the nozzle tip exit orifice 44. For example, the tip might be coated with a hydrophobic material, such as PTFE (e.g., Teflon®). Optionally, art-disclosed structures for concentrating fluid flows, e.g., to a predetermined point or region, may be utilized in association with the nozzle tips 38. Shown in FIGS. 3 and 4, the nozzle tips 38 are individual tubular structures assembled to a common manifold 46. In another embodiment, one or more unitary members (e.g., blocks), might be bored out such as by micro machining, to provide a microfluidic type fluid distribution network, which obviates the need for individual tubes. In yet another embodiment, the tubes are placed in and held by the walls of the unitary members defining the bores. The diameter of the nozzle tips 38 may vary in shape or size along its length, e.g., by constricting or expanding, or it may be constant shape, size or both.

Though other structures (e.g., circular) are possible for the exit orifice, in one embodiment, the nozzle tip exit orifice 44 is elongated, as defined by a sloping tip wall 48 in FIG. 3. The preferred slope may range from about 10 to about 80 degrees. More preferably it is about 30 to about 60 degrees. Still more preferably it is about 45 degrees.

Figure 5:
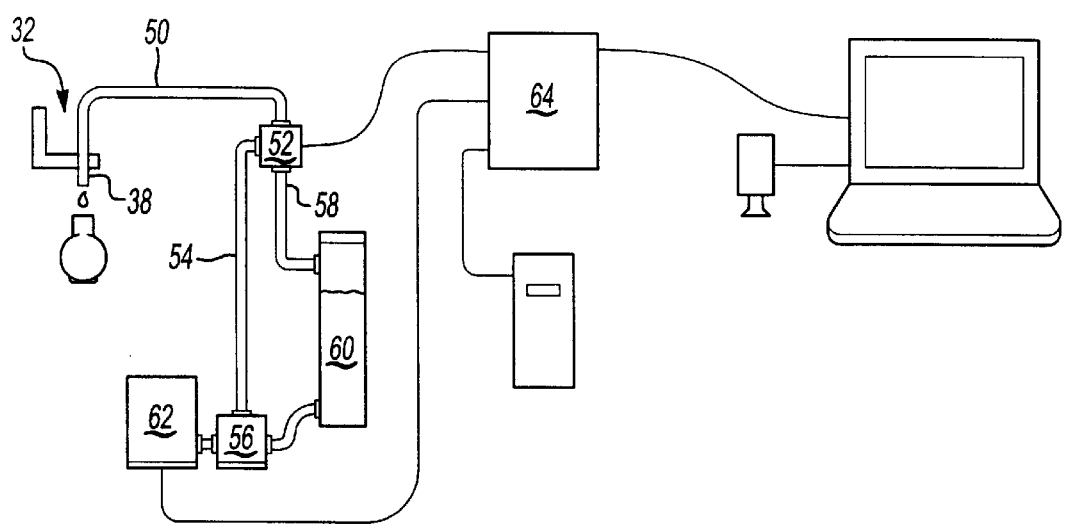
FIG. 5 is a schematic view of one example of a system of the present invention.

Referring also to FIG. 5, one or a plurality of supply lines may be used to transfer fluid from a source such as a supply container 60 (which might be integrally associated with the supply line) to the nozzle tip 38. Valves, joints, flow meters, filters, connectors, and the like may be employed along any such line as desired. Nozzle tips 38 optionally may be integrally formed on the supply lines. One supply line might feed to one or a plurality of nozzle tips 38. Alternatively, a plurality of supply lines might feed a plurality of nozzle tips or a single nozzle tip 38. The supply lines may be arranged for sequential fluid distribution, for parallel distribution or a combination thereof. Additionally, it may be possible to vary the size, shape, length, diameter, cross sectional area, or material at one or multiple points or throughout the supply line.

Fluids are delivered through the supply lines through the use of any suitable delivery mechanism, such as a pump. The pump is driven by any suitable means, such as a motor, hydraulics, pneumatics, or the like. The nail polish dispensing system is thus provided with one or a plurality of delivery mechanisms to drive fluid from the one point of a supply line (e.g., from a fluid source container) to a second point (e.g. nozzle, valve or receptacle). One pump may be utilized to drive one or a plurality of lines. Alternatively, a plurality of pumps may be utilized the drive a plurality of lines or a single line. It will be recognized that any suitable servomechanical actuator may be employed.

In a preferred embodiment, a pump delivers fluid through a supply line into a suitable valve. Depending upon the switching state of the valve, the valve will then either permit passage to a nozzle tip or divert fluids back to a supply line, to a recirculation vessel or to some other location. Referring to the schematic drawing represented in FIG. 5, an example of such a nail polish dispensing system is illustrated by with reference to only one exemplary fluid line. The nozzle 32 is positioned to be in close proximity to any desired fluid receptacle. The nozzle 32 is connected to a supply line 50, which runs to a diverter valve 52. From the diverter valve 52, the supply line 50 is divided alternative desired flow paths. For example, FIG. 5 shows a first supply line branch 54 from a pump 56 and a second supply line branch 58 from a supply container 60. As illustrated, the pump 56 is driven by a motor 62 in any suitable location. A predetermined amount of nail polish ingredients are supplied to a line. The motor 62 and the valve 52, in turn, are controlled by a suitable control, which receives input from the computer interface from the user.

Upon selection of a desired nail polish composition, appropriate signals are sent to the control unit 64. The control unit 64 directs the motor for actuating the pump 56, which then drives the selected fluid in the desired amount through at least a portion of the supply line 50. After a predetermined amount of time or fluid has passed, the control may signal for the valve to close, thereby terminating flow to the nozzle tips 38. Fluid already in the lines upstream of the valve can be then redirected (possibly aided by the pump or another fluid delivery mechanism) by the valve into the second supply line branch for returning to a supply container. In a preferred embodiment, the control of the valve is based upon flow amounts per unit time. Optionally the controller is programmable to take into account any desired changes to conduit size, shape or material, the viscosity of the fluid, the operating temperature, and any desired variations to the motor or pump. Of course, other features may be employed in connection with the above, such as an art-diclosed waste collection system, an art-disclosed line purging system, an art disclosed line cleaning system or the like. For instance, the supply lines may be suitably connected to a solvent supply that can pump solvent through the lines.

It should be appreciated that the materials dispensed will be to result in a liquid cosmetic, but that some of the dispensed materials might be finely particulated solids. Thus, the present invention is not limited only to the use or dispensation of liquid ingredients. Use and dispensation of finely particulated solid ingredients are contemplated as well.

Figure 6:
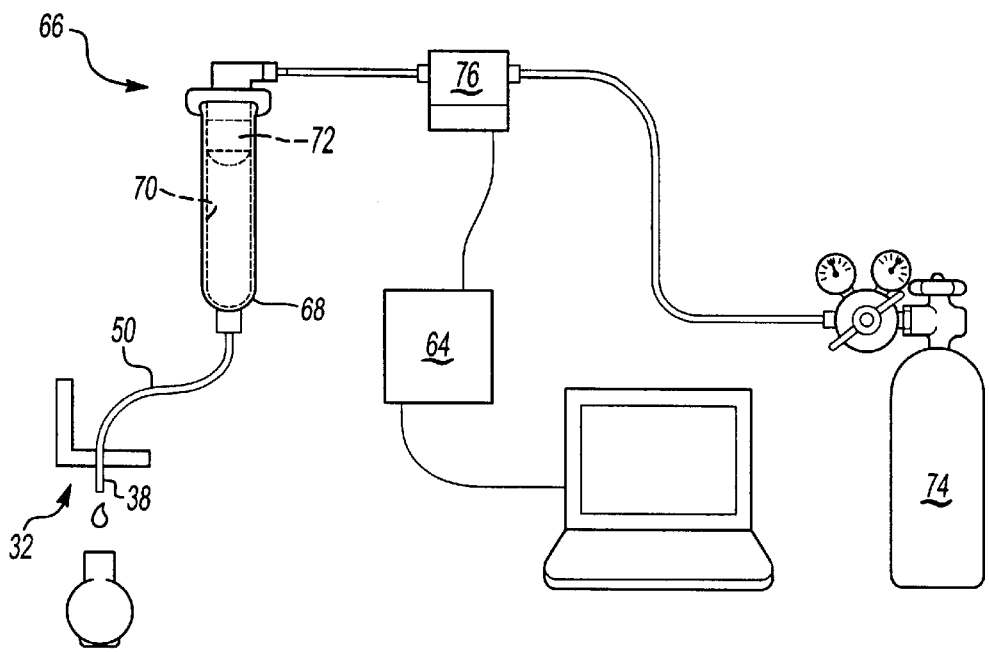
FIG. 6 is a schematic view of another example of a system of the present invention.
Figure 7:
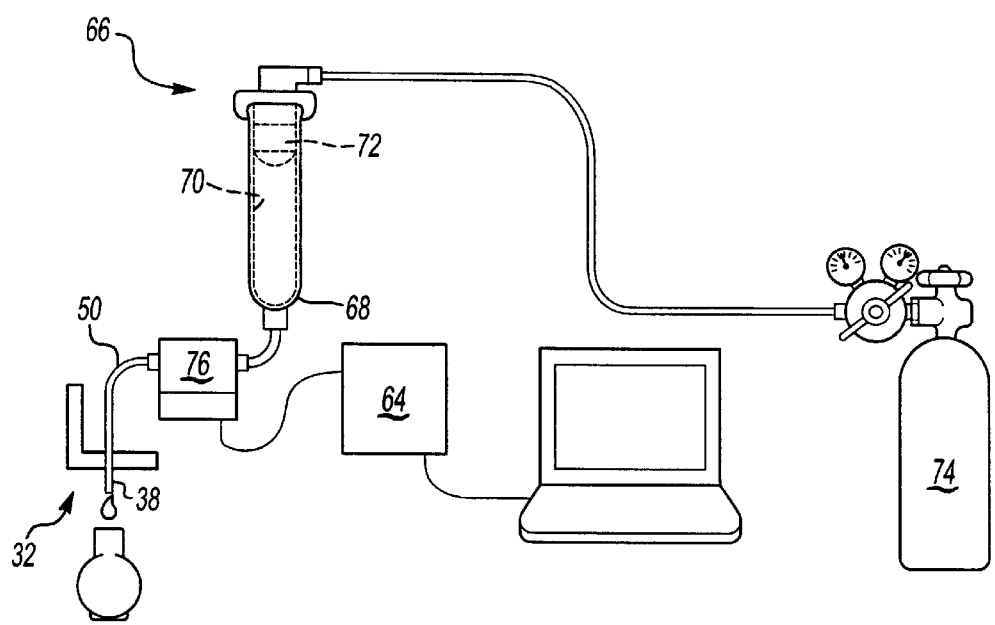
FIG. 7 is a schematic view of yet another example of a system of the present invention.

In FIGS. 6 and 7, there is shown an alternative delivery system employing a syringe dispensing mechanism 66. A syringe 68 includes a cylinder 70 for receiving a plunger 72. Fluid is introduced into the cylinder and is driven through a nozzle tip by pressure applied to the plunger (e.g., from an actuator). Thus, the pump and motor of previous embodiments have been replaced or supplemented with a gas supply (e.g. an air or gas canister or compressor with suitable regulator) and a syringe configuration. Referring to FIG. 6, a supply line connects a nozzle system 32 with one or a plurality of syringes. The syringes 68 are configured with an exit port, from which fluid for dispensing can flow from the syringe cylinder towards the nozzle, and an intake port (e.g., located in an air cap or other suitable cylinder capping device) located upstream of the plunger for receiving a suitable driving gas for actuating the plunger. Alternatively, the plungers may be driven by any other suitable mechanism, such as a motor. Pressure can be regulated as desired by a controlled valve located between the gas supply 74 and the syringe 68. Shown in FIG. 6, a suitable valve (e.g. an electronic valve 76 controlled by an electronic control unit 64 in signaling communication with a computer) is located upstream of the syringe 68. Any suitable commercially available valve or syringe may be used, such as available through SEMCO. In FIG. 7, the valve is located downstream of the syringe 68. Each syringe may be controlled by its own electronic control unit, a single unit can control a plurality of syringes, or a single syringe can be controlled by a plurality of control units. Any suitable controller may be used, such as available through MICRO-SCIENCES (Redondo Beach, Calif.).

For all of the above embodiments, the ingredients that are dispensing into the system may be supplied in any suitable manner. For instance, the different ingredients can be supplied in separate containers, such as tanks, canisters, ampules, cartridges, or the like. In one embodiment, the containers are supplied as individual units. For example, a container containing a single color or effect ingredient is packaged by itself and connected to the supply system individually. In another embodiment, the containers are supplied in a kit. For example, an assembly of containers, each containing a different color or effect ingredient, is packaged together and connected to the supply system as a unit. In this regard, it is possible that ingredients are packaged in a container having an opening at a remote location and a removable cap or lid is applied over the opening at such location, and then removed at the point of dispensing. Alternatively, the opening of the container might be sealed with a removable or rupturable membrane. In this manner a supply line can be quickly connected to the container such as by puncturing the membrane.

Figure 8A:
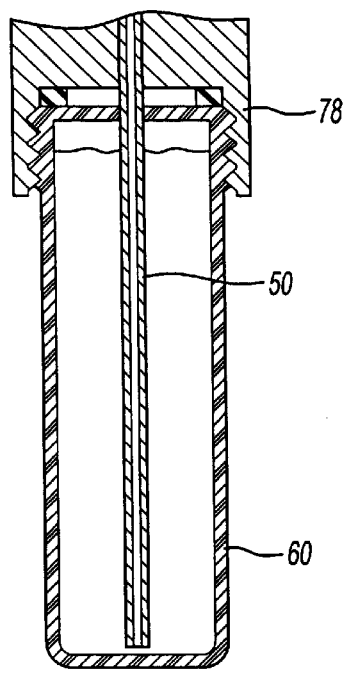
FIGS. 8A–8D are illustrative examples of alternative fluid chambers.
Figure 8B:
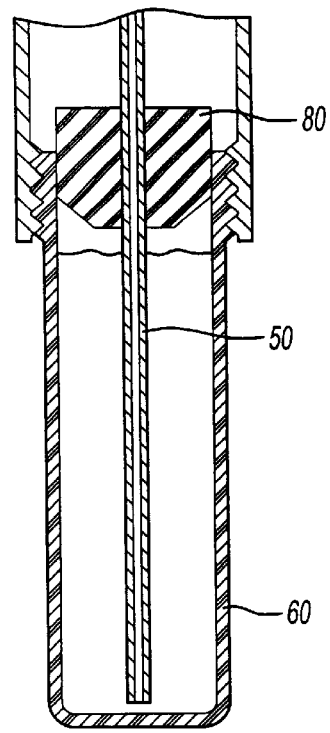
Figure 8C:
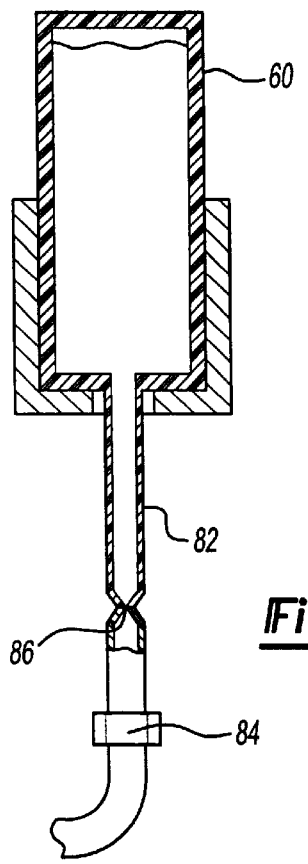
Figure 8D:
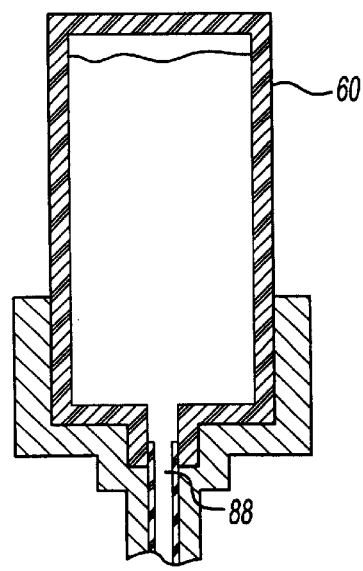

In this regard, as shown in FIGS. 8A and 8B, a supply line 50 might be equipped with a suitable fitting (e.g., a threaded sealing member 78, a stopper 80 or the like) for releasable attachment to the supply container 60. In another embodiment, as seen in FIG. 8C, a supply container 60 is provided with its own individual supply line 82 that can be matingly attached directly to the fluid delivery mechanism, to a fitting 84 associated with another supply line, or the like. In the embodiment illustrated, the line might itself terminate in a frangible or rupturable wall structure 86, for attachment to a mating component. In yet another embodiment, as seen in FIG. 8D, a supply container 60 may have a membrane configured to rupture from a protruding finger 88 associated with a member for receiving or holding the container 60 and a suitable applied force. Other structures are possible as well.

Thus, it is seen how the apparatus of the present invention can be kept stocked with desired inventory levels. As discussed previously, in connection with the inventory control aspect of the present invention, as each respective container is installed into the fluid delivery system of the present invention, the computer associated with the operation of the present invention may be suitably programmed to detect the installation and recalculate inventory amounts. Operators can be advised of a reduction in inventory. In one aspect, the computer is specifically programmed to notify the operator to order additional inventory. In another embodiment, the computer is specifically programmed to notify a remote subscriber of the system (e.g., over the internet), of the reduction in inventory, obviating the need for the on-site operator to monitor inventory amounts.

Referring to FIG. 3, the nozzle system of the present invention may optionally include a moistener 90 for assisting the prevention of clogging from dried nail polish at the nozzle tips. A preferred moistener 90 includes a sealable receptable that is moveable between an open and closed position. The receptacle defines a chamber for holding a volume of liquid, or for containing a porous substrate saturated with a volume of liquid for vaporizing a liquid at the nozzle tip.

A suitable solvent or liquid is placed in the receptacle, such as water, alcohol, ketones, petroleum distillates, paint thinners or the like. Optionally, as shown in FIG. 3, a material suitable of absorbing fluids is placed within the chamber of the cup to enhance fluid retention within the system. Some examples of absorptive materials are cloth felt, sponge, fiber material, batting, woven or unwoven fabric, chopped fiber and like materials. In a preferred embodiment, the absorptive material is a porous substrate 92, which is maintained generally in a saturated state. The solvent or fluid may be poured into the receptacle and later emptied in a batch type mode, periodically or continuously flowed through the receptacle, or a combination.

The receptable is preferably secured to a wall of the dispensing system with suitable linkage for permitting it to be moved relative to the nozzles. In a more preferred embodiment, a pivotal linkage (e.g., a bent arm pivotal linkage) system is employed for permitting rotational, vertical and horizontal translation of the receptable. In a most preferred embodiment, shown in FIG. 3 the suitable mechanism as previously stated would also have at least one biasing member (e.g. a spring 94) mounted to the linkage arms and to a fixed member such as the body of the nail polish dispensing system. In this manner, the linkage maintains the receptacle disposed at a predetermined distance from the wall 74, while allowing pivotal rotation. The spring biases the arms to their normal rest position, e.g., for sealing the nozzle tip. In one preferred embodiment, the bent arms are defined by spaced bars (e.g. a 4-bar linkage 96).

An example of another suitable device that may be adapted for use in the present invention is disclosed in U.S. Pat. No. 5,842,641 (Mazzalveri).

As will be appreciated from the above discussion, the heretofore unexpected elegant advantages of the present invention renders it suitable for application in a number of different environments including but not limited to point of sale dispensing at nail or hair salons, spas, health clubs, country clubs, hotels, shopping malls, strip centers, airport concourses, grocery stores, convenience stores, automated teller machines (in one aspect of the present invention, the user may even debit an account in order to pay for the product purchased), waiting rooms of automotive service shops or other service companies, photo studios, night clubs, restaurants, coffee house, stadiums, flea markets, parks, street vending booths, gas stations, and department stores ranging for mass-market stores to exclusive retail shops.

Figure 9:
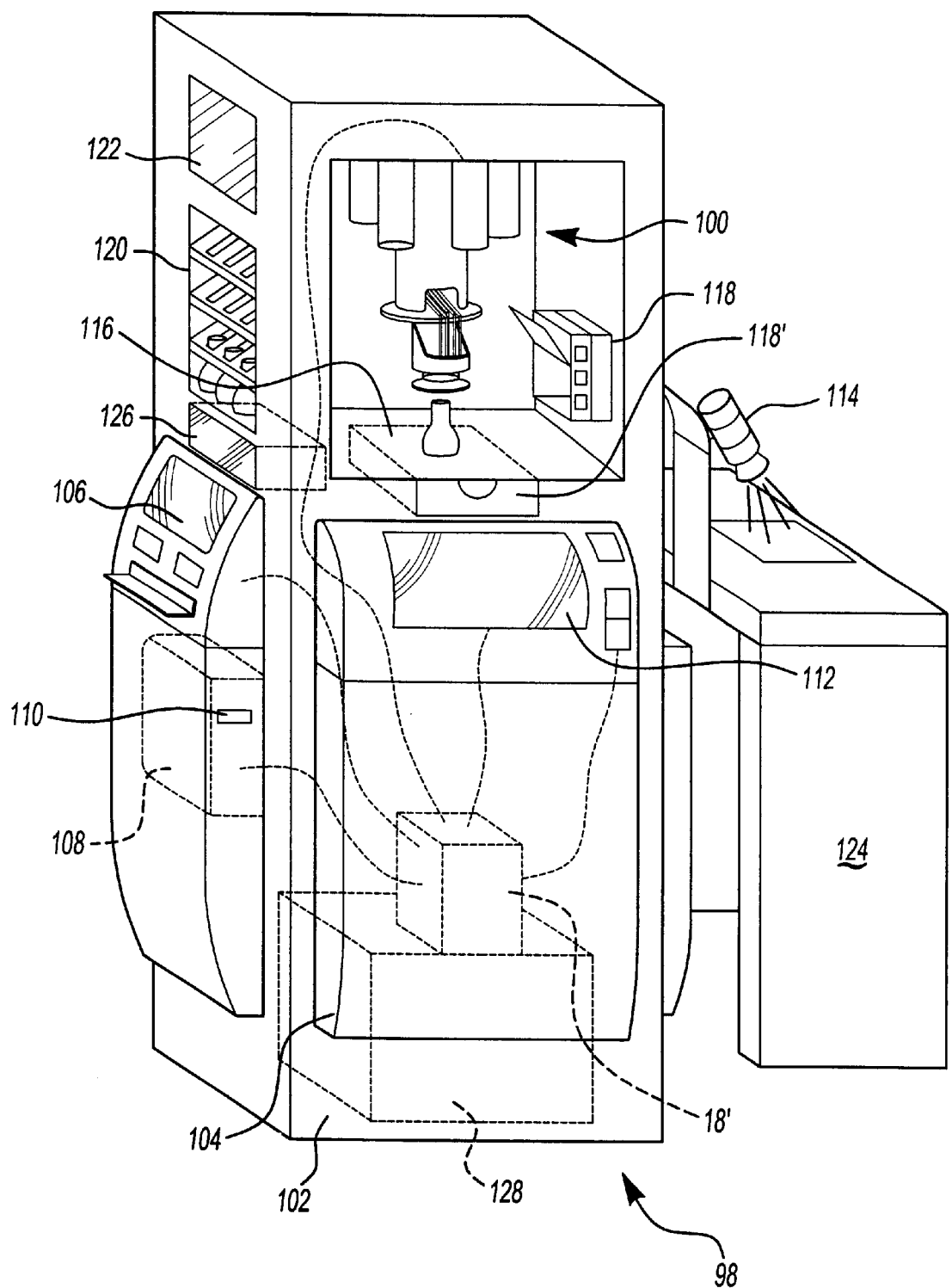
FIG. 9 is an illustrative example of a modular system of the present invention.

In one preferred embodiment, as shown in FIG. 9, for use at a site where the point of sale is the same as the point of dispensing, the system of the present invention is separated into two or more modular components (such as for use in a store or other more permanent site dedicated to the sale of these products), and in another it is integrated into a single pod 98 or kiosk (such for temporary sites, or use or operation within pre-existing businesses like a beauty salon, the corridor of a shopping mall, or within any of the businesses identified in the immediate previous paragraph). For instance, the modular components may include a delivery system 100 (e.g., dispensing device; which itself may include transparent components, e.g., fluid chambers) illustrated as having at least a portion of its components confined within a housing 102. The housing 102 preferably has openable panels 104 for allowing access to the interior and the enclosed components.

Preferably, the computer 18' for operating the system resides in the housing 102, though optionally it may reside additionally or instead at a remote location, e.g., for communication over the internet. The computer is shown as the phantom box within the housing 102 in FIG. 9. However, one or more input devices provide a user interface with the computer, dispensing system or both. For instance, in FIG. 9, a first input device 106 enables a user to interact with the computer to determine a custom formulation. The user can thus make a computer-assisted formulation selection and input the information (e.g., via a touch screen as shown or some other input device) to the computer. When input is complete the computer will signal an output device 108 (e.g., a hot-stamp device, printer, bar code printer, or a suitable magnetized or electronic encoded smart card for retrievably storing data), which will generate a card or other printout containing such information, which will exit the slot 110. The card may be paper, plastic or the like. In one embodiment it is generally credit-card sized. In another embodiment it is a standard index card size. The printout thus preferably contains information about the user's selection, including a formulation and optionally biographical information, account or credit information (for enabling an immediate or deferred transaction payment) or historical consumer information about the user. The computer optionally will store information about a user's selection, and correlate the same with a file created for the user and having a unique identifier, such as an account number, personal identification number, password or the like. The printout, however, enables the user to carry such information away and preserve it for later reference. Further, any of the first input devices may have a device for reading information from the printout, so a user can present such printout at a remote time and the reader reads it and retrieves information associated with the user from computer memory.

The user may be able to control operation of the dispensing device directly from the first input device 106. As shown in FIG. 9, a second input device 112 is provided for inputting data obtained from the information entered into the first input device 106. The second input device 112 (e.g., by manual entry to a touch screen, by a bar code reader, a card swiping device, or other suitable input device) takes information obtained from the first input device 106 (either as stored electronically on the computer, as contained in the printout, or as provided in the first instance from the user without computer aid through use of the first input device), and signally commands dispensing from the dispensing device. Other input devices may also connect with the computer, such as a spectrophotometer 114, for providing information for the formulation selection.

The housing 102 includes a support surface 116 (shown as static, but optionally may be translatable) upon which a container may rest while dispensing. Moreover, a vibratory shaker or other suitable mixer 118 can be mounted to or otherwise associated with the housing 102. Shown in FIG. 9 is an alternative site for a shaker 118'. Other sites are possible as well.

As shown, there may also be display shelves 120 associated with the pod 98. The display shelves may be stocked with a variety of different prepackaged base materials (e.g., for nail polishes, iridescent, metallic, sheer, opaque, glossy, white, clear, etc.). Thus a user could hand select base materials, removing them from a shelf and placing it by the dispenser for dispensing. Further, there may be an advertising or display light box 122. One or more additional work stations may also be employed, such as a table 124. As desired, the housing 102 may be opaque or transparent over some or all of its surfaces. For instance, a glass panel may cover and allow viewing of the dispensing device. A suitable drawer 126 (e.g., one having a glass face) or other panel may define additional storage or provide a location, equipment (e.g., a suitable capillary action dispenser, pump bottles, or other like dispenser) or both for performing additional steps in the preparation of the formulation, such as the addition of a fragrance. Further, a suitable stand 128 may support the computer 18'.

It will be appreciated that the functions performed by the above input and output devices may be divided among multiple devices or integrated into a single device. Further, functions performed by one device may alternatively be performed by another of the devices within the scope of the present invention. Multiple computers may likewise be employed, either independent of one another or linked for communication between or among one another. Moreover, the input devices can directly communicate with the dispensing system or indirectly communicate via an additional medium (e.g., computer). Each of the respective components may be controlled independently, through its own control system, or by way of one of the computers. It is also possible that the computer of the pod may be substituted or supplemented with a suitable connection to a network for accessing a remote computer.

The pod also optionally includes a cash register, packaging station, a display station, an application station (which may be adapted for housing an on-site manicurist), or a combination of the above. One integrated system also incorporates some or all of the modular components recited above and may also afford counter space, seating, mirrors, or other consumer convenience features. The integrated systems may be assembled or prefabricated as individual units with suitable wiring for power supply or supply of other utilities such as telephone, cable, internet, satellite communication or the like.

Products offered for sale using the present system may be sold in combination with other nail care products (e.g., files, clippers, polish removers, top coats, base coats, images, effects or the like), cosmetics, and vanity accessories such as hair equipment or devices, jewelry, temporary or permanent tattoos, decals, stickers, fragrances, shoes, or other articles of clothing (some or all of which may also be customized in color or effect to match or complement the choice of nail polish color or effect).

It is also possible that the system of the present invention is employed in combination with other custom cosmetic systems, such as that disclosed in U.S. Pat. No. 5,945,112 (Flynn et al.) hereby incorporated by reference, which addresses a skin foundation customizer using a spectrophotometer to measure skin color and using such data to custom formulate a foundation.

Additionally, the system of the present invention can be modified for other applications that require custom formulation fluid dispensing. Thus, the present invention is contemplated to include custom dental material formulations, custom health and beauty aid products, custom fragrances, custom pharmaceutical compounds, custom lubricants, custom foods (e.g., spices, flavors, or the like), custom beverages and other liquid chemical compositions that are to be used or packaged at the point-of-dispensing locations.

The following Example is provided by way of illustration, and without intending to limit the scope of the present invention.

EXAMPLE

A customer to a retail site encounters a system in accordance with the present invention where the point of sale and the point of dispensing is the same; that is, both events occur proximate one another at the retail site. The customer places her hand in viewing range of a digital camera associated with the system. The camera photographs an image of the customer's hand and transfers that image digitally to a computer. The computer scans the image (e.g., pixel by pixel) and identifies patterns of tones, relative concentrations of tones or contrasts, which the computer would compare with a programmed set of values selected to replicate the characteristic tones of a fingernail. Upon locating the image of the screen that would correspond with fingernails, the computer would erase the image of the customer's natural nail, and provide a surrogate shape in its place.

The customer then selects different colors from a pallet of colors (e.g., from a stand-alone display of color chips, a color chart, or from the same stored in computer memory). The customer inputs the color choice to the computer. The computer searches its database and upon retrieving information about the color outputs the color by filling in the surrogate nail shapes. The customer can thus view her own hand on a video display with the color of choice. Of course, the customer will have the option of bypassing the imaging step, and proceeding straight to the order placement.

A customer will have the option of saving several copies of the image, either side by side or on separate screens, with one or more different colors for comparison, or later use.

Once the customer selects a color, the customer enters the selection into the computer. The computer retrieves information about the color from a database, and specifically a recipe for the color, identifying the relative proportions of tones, shades, or hues of colors or pigments that must be added to achieve the desired color. This information is communicated to the dispenser, which then dispenses the correct amounts pursuant to the recipe communicated from the database for the color choice. The customer also has the option of adding effects such as sparkles, metal flakes, fragrance, textures or shapes, as desired, using a similar input and dispensing system. In this manner, the customer is afforded the opportunity to custom mix and dispense a nail polish on-site at point of sale.

Although the invention has been described with particular reference to certain preferred embodiments thereof, variations and modifications can be effected within the spirit and scope of the following claims.

What is claimed is:

1. A method of custom formulation of a nail comprising the steps of:
    a) providing, at a retail point of sale, a pod including an automated nail polish dispenser including a plurality of syringe dispensers containing different nail polish ingredients and being radially disposed about an axis for dispensing ingredients of a nail polish formulation, and a computer adapted for controlling said syringe dispensers;
    b) displaying on said pod a user interface with said computer for permitting a user to input information into said computer for selecting a nail polish formulation;
    c) selecting a first nail polish formulation at said point-of-sale via said user interface;
    d) actuating one or more of said syringes for dispensing said first nail polish formulation into a first nail polish container with said automated nail polish dispenser based upon a recipe associated with said first nail polish formulation stored in said computer;
    e) outputting information from said computer about said selection of said first nail polish formulation for allowing said information to be carried away and preserved for later reference;
    f) selecting a second nail polish formulation at said point-of-sale via said user interface;
    g) actuating one or more of said syringes for dispensing said second nail polish formulation into a second nail polish container with said automated nail polish dispenser based upon a recipe associated with said nail polish formulation stored in said computer; and
    h) outputting information from said computer about said selection of said second nail polish formulation for allowing said information to be carried away and preserved for later reference.

2. A method of claim 1 further comprising storing information about said selection of said first nail polish formulation for future retrieval; and storing information about said selection of said second nail polish formulation for future retrieval.

3. A method of claim 1 further comprising displaying articles on shelves of said pod.

4. A method of claim 3, wherein said displaying includes displaying of prepackaged base material on shelves of said pod.

5. A method of claim 1, further comprising enclosing said automated nail polish dispenser in said pod behind a transparent surface.

6. A method of custom formulation of a nail polish comprising the steps of:
    a) providing, at a retail point of sale, an automated nail polish dispenser including a plurality of dispensers containing different nail polish ingredients and being radially disposed about an axis for dispensing ingredients of a nail polish formulation, and a computer having color recipe information stored therein and being adapted for controlling said dispensers;
    b) providing a user interface with said computer for permitting a first user to input information into said computer for selecting a nail polish formulation;
    c) displaying to said first user a visual depiction representative of a selection for a nail polish formulation;
    d) matching a color selection with a spectrophotometer;
    e) selecting a first nail polish formulation at said point-of-sale via said user interface;
    f) actuating one or more of said dispensers for dispensing said first nail polish formulation into a first nail polish container with said automated nail polish dispenser based upon a recipe associated with said first nail polish formulation stored in said computer;
    g) outputting information from said computer about said selection of said first nail polish formulation for allowing said information to be carried away and preserved for later reference;
    h) selecting a second nail polish formulation at said point-of-sale via said user interface;
    i) actuating one or more of said dispensers for dispensing said second nail polish formulation into a second nail polish container with said automated nail polish dispenser based upon a recipe associated with said said nail polish formulation stored in said computer; and
    j) outputting information from said computer about said selection of said second nail polish formulation for allowing said information to be carried away and preserved for later reference.

7. A method of custom formulation of a nail polish comprising the steps of:
    a) providing, at a retail point of sale, a pod including:
        a. a custom nail polish dispenser including a plurality of dispensers containing different nail polish ingredients and being adapted for dispensing ingredients of a nail polish formulation at said retail point of sale;
        b. display shelves;
        c. a drawer;
        d. a counter;
    b) selecting a first nail polish formulation at said point-of-sale;
    c) actuating said nail polish dispenser for dispensing said first nail polish formulation into a first nail polish container;
    d) selecting a second nail polish formulation at said point-of-sale; and
    e) actuating said nail polish dispenser for dispensing said second nail polish formulation into a second nail polish container.

8. A method of claim 7, wherein said pod further includes seating, and said pod is wired for supply of utility functions.

* * * * *

UNITED STATES PATENT AND TRADEMARK OFFICE
CERTIFICATE OF CORRECTION

PATENT NO.         : 6,622,064 B2
APPLICATION NO. : 09/818389
DATED              : September 16, 2003
INVENTOR(S)        : Julie Bartholomew et al.

It is certified that error appears in the above-identified patent and that said Letters Patent is hereby corrected as shown below:

On the Title page, (54) should read as following:
NAIL POLISH COLOR SELECTION SYSTEM AND METHOD ITEM (56) SHOULD READ, 5,933,792  11/1999  Rath et al.

Col. 15, line 17, please insert "polish" between the words nail and comprising.

Signed and Sealed this

Twenty-second Day of August, 2006

JON W. DUDAS
*Director of the United States Patent and Trademark Office*